No. 777,995. Patented December 20, 1904.

UNITED STATES PATENT OFFICE.

JOHN ANDERSON, OF MONACA, PENNSYLVANIA.

FIRE-BRICK COMPOSITION.

SPECIFICATION forming part of Letters Patent No. 777,995, dated December 20, 1904.

Application filed January 9, 1904. Serial No. 188,385.

*To all whom it may concern:*

Be it known that I, JOHN ANDERSON, a citizen of the United States of America, residing at Monaca, in the county of Beaver and State of Pennsylvania, have invented certain new and useful Improvements in Fire-Brick Composition, of which the following is a specification.

This invention relates to certain new and useful improvements in a composition for fire-brick, and has for its object the provision of novel means whereby a stone or block is produced that will effectually withstand the highest degree of heat.

Another object of the present invention is to produce a composition that will be inexpensive, strong, durable, and one that may be advantageously employed for many purposes.

The present invention, broadly considered, relates to fireproof material, but relates more particularly to the composition of a silica brick.

Silica bricks or building-blocks are usually made with lime in order to bind the mass together; but it has been found that under certain degrees of temperature the lime will lose its binding qualities and the brick will crumble. It is the object of the present invention to effectually overcome these difficulties and produce a brick or block that may be used for the construction of furnaces, kilns, and other structures of fireproofing.

In carrying my invention into effect I employ approximately ninety degrees of silica-sand, five per cent. or less of asbestos, and five per cent. or less of fire-clay. The asbestos and fire-clay are first thoroughly mixed together before this mixture is placed with the sand. A sufficient quantity of salt water in the proportion of one gallon of water to one ounce of salt is then added to the silica, asbestos, and fire-clay and thoroughly moistens the same. From this mixture bricks, blocks, or stones are formed of the desired dimensions, which are first thoroughly dried in the usual manner and then burned in the kiln.

The asbestos and clay will have the necessary binding qualities, and the salt water is added for the purpose of moistening the mass and also produces the chemical change of both hardening the mass and fluxes the sand, asbestos, and fire-clay together.

It will be understood that I do not wish to limit myself to the exact proportions stated herein, and I have found by practical experiments that the best results are obtainable as heretofore stated. It will also be noted that in lieu of the silica-sand any well-known clay may be used, together with the asbestos and fire-clay and salt water.

Having fully described my invention, what I claim as new, and desire to secure by Letters Patent, is—

The composition for fireproofing consisting of silica-sand ninety per cent., asbestos five per cent., fire-clay five per cent., and a sufficient quantity of salt water.

In testimony whereof I affix my signature in the presence of two witnesses.

JOHN ANDERSON.

Witnesses:
N. WURZEL, Jr.,
JOHN W. EARL.